Oct. 26, 1926.

J. ROZGONYI

RELIEF PHOTOGRAPHY

Filed March 20, 1925

Joseph Rozgonyi
INVENTOR

BY *Julian J. Wittal*
ATTORNEY

Patented Oct. 26, 1926.

1,604,319

UNITED STATES PATENT OFFICE.

JOSEPH ROZGONYI, OF NEW YORK, N. Y.

RELIEF PHOTOGRAPHY.

Application filed March 20, 1925. Serial No. 16,951.

This invention relates to relief photographs and the method of making the same, and it is the principal object of the invention to produce by a simple and inexpensive method a relief photograph representing a picture of a person en relievo true to life, and one which allows the correction of the features by means of suitable sculptors' tools or the like.

Another object of the invention is the provision of a relief picture or photograph of any subject by persons not necessarily versed in the art which combines the appearance of a photograph with the appearance of a plastic work of art.

A further object of the invention is the provision of a simple method of making pictures of this type by the use of inexpensive materials without destroying or marring the beauty of the original picture.

A still further object of the invention is the provision of a relief picture by transferring the same to a cardboard or the like material forming the background for the finished relief picture, and by cutting the contours of the picture from said board, whereafter the cut out part is filled with a plastic mass subject to harden within a certain time, and exposing said mass to a certain pressure.

These and other objects of my invention will become more fully known as the description thereof proceeds, and will then be specifically set forth in the appended claims.

In the accompanying drawing different steps of the method and the different stages of the making of a relief picture or photograph are shown, and in this drawing.

Figure 1:
Fig. 1 shows a photograph from which it is intended to make a relief picture according to my novel method.
Figure 2:
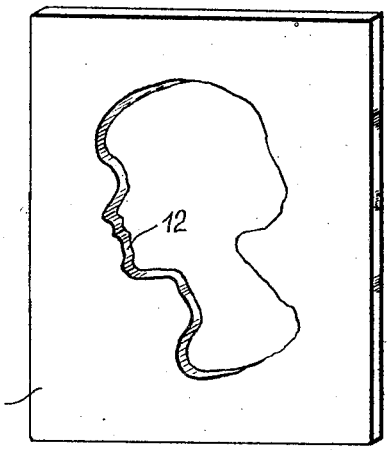
Fig. 2 shows a matrix used in making my relief photographs.
Figure 3:
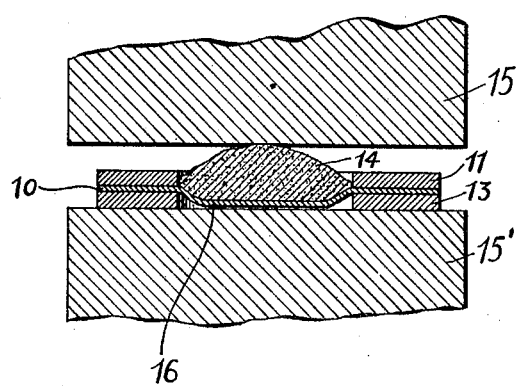
Fig. 3 illustrates by a cross sectional view the arrangement for making my relief photographs through the use of a press, of two matrices, and a plastic material.
Figure 4:
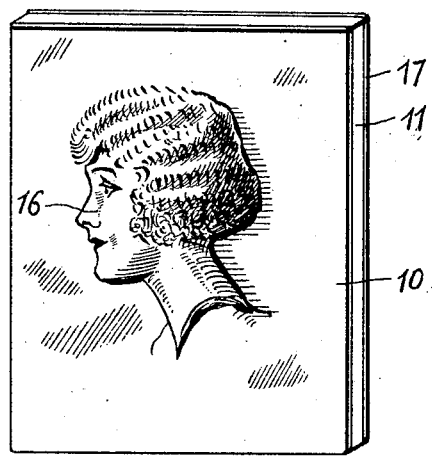
Fig. 4 is a front view of a finished photograph.
Figure 5:
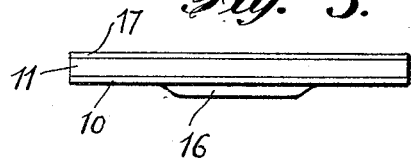
Fig. 5 is a top edge view thereof.

A photograph 10, showing any desired subject, for instance in this case the picture of a lady, is placed on a piece of cardboard 11 or other similar suitable material, and the outer contours of the picture are then transferred by any suitable known method to the cardboard. Thereupon the outer contours of the picture are cut out of the cardboard in the manner indicated by 12 by any suitable tools adapted to make a clean cut and the photograph is then pasted at the rear of said cardboard with its contours in exact alignment with the outlines of the cut out portion 12. Another exactly similar cardboard matrix 13 is also made and this one is then placed over the side of the first matrix on which the photograph 10 has been pasted, its outlines being in exact alignment with the contours of the picture and with the cut out portion of the first matrix carrying the photograph. The two cardboard matrices with the photograph therebetween are then placed into any suitable press and the space back of the photograph and located in the cut out portion of the cardboard matrix 11 carrying the photograph is then filled with a special mass 14 which is plastic and pliable when fresh but which will gradually harden. For such a material I may use wax, modelling clay, plaster of Paris or the like, but I prefer to make use of a special mass the composition of which has been developed by myself, and which mainly consists of gypsum powder and glue of equal proportions in weight. The amount of the mass placed in the cut out portion of the matrix carrying the photograph, is dependent on how far I want the relief picture to be produced to protrude from the plane of the photograph. A certain excess of material is placed on top of the one calculated to exactly fill the cut out space in the cardboard matrix and this excess will determine the amount of relief produced in the picture. The excess amount naturally need not be as large as to cause the material of the photograph sheet to be stressed to the breaking point, as will be more fully explained presently.

After the two matrices, the photograph secured to the top one and being in between the two, and the necessary amount of plastic mass are placed in the press, the jaws or pressure exerting surfaces 15 and 15' of the same are gradually neared to one another thereby exerting a pressure, at the start a very moderate one which is being gradually increased, on the mass 14 and causing the same to fill the cut out portion 12 and thereafter to cause the photograph 10 to bulge outwardly corresponding to the cut out portion, that is the outlines of the picture to be made in relief, as indicated at 16. The pressure is kept up until the mass 14 is pressed flatly into the recess 12. The two matrices are thereupon taken from the press, and the lower one, 13, may again be used for a similar operation, while the upper one, 11, carries the photo 10 now made in relief as at 16. It is understood that the photograph, while the plastic mass 14 is still pliable, can be relieved of all irregularities by means of suitable sculptors' tools and can be otherwise also suitably shaded and retouched.

A suitable backing 17 is thereupon pasted to the back of the matrix 11 with the relief picture thereon, and the picture may have suitable colorings, backgrounds, etc., applied thereto in order to enhance its artistic appeal and originality.

Other matrices 11 with copies of the subject secured on them may be used for a similar treatment, being supported while in the press by the matrix 13, and in this way my invention can be used for commercially producing any number of plastic effect photographs from one original.

While I have described the preferred form of the relief photograph by way of example, it is to be understood that such changes may be made in the same and in the method of making the picture, as fall within the scope of the appended claims without departure from the spirit of the invention.

What I claim, is:—

1. A process for making pictures in relief from plane photographs, comprising in copying the contour of said photograph on a cardboard or similar plate, cutting out the contour of the picture in said photograph from said cardboard and making thereby a first matrix of said picture, preparing a similar second matrix, securing the sheet of the photograph on said first matrix, the outlines of the picture being in exact alignment with the contour of the cut out portion of the first matrix, filling the space in said cut out portion back of the sheet of the photograph with a suitable slowly hardening pliable plastic material, having a desired amount of excess of it, placing the second matrix underneath the first one the photograph being between the two and the outlines of the cut out portion of the second matrix being in exact alignment with the outlines of the picture placing the two matrices, with the photograph sheet and the plastic mass between them, between the pressure surfaces of a press and pressing the plastic mass flat into the space in the cut out portion of the first matrix thereby causing the picture to bulge out in relief, removing said second matrix and placing a backing on the rear of the first matrix.

2. In a process for making pictures in relief, as per claim 1, said plastic mass comprising gypsum powder and glue.

3. In a process for making pictures in relief, of claim 1, said plastic mass being composed of powdered gypsum and glue of equal proportions by weight.

Signed at New York, in the county of New York, and State of New York, this 4th day of March, A. D. 1925.

JOSEPH ROZGONYI.